US011966211B2

(12) United States Patent
Weisensel et al.

(10) Patent No.: US 11,966,211 B2
(45) Date of Patent: Apr. 23, 2024

(54) INDUSTRIAL COMMISSIONING PROCEDURES INCLUDING LOOP CHECKING

(71) Applicant: Marking Services Incorporated, Milwaukee, WI (US)

(72) Inventors: Andrew Weisensel, Oak Creek, WI (US); Jeffrey Dickinson, River Hills, WI (US); Scott Rieck, West Allis, WI (US); Clint Wayne Landon, San Angelo, TX (US); Karim Khidhayir, Danbury, CT (US)

(73) Assignee: Marking Services Incorporated, Milwaukee, WI (US)

( * ) Notice: Subject to any disclaimer, the term of this patent is extended or adjusted under 35 U.S.C. 154(b) by 751 days.

(21) Appl. No.: 16/953,876

(22) Filed: Nov. 20, 2020

(65) Prior Publication Data

US 2022/0163941 A1 May 26, 2022

(51) Int. Cl.
*G05B 19/406* (2006.01)
*G06F 16/242* (2019.01)
(Continued)

(52) U.S. Cl.
CPC ......... *G05B 19/406* (2013.01); *G06F 16/242* (2019.01); *G06F 16/284* (2019.01); *G06F 16/9532* (2019.01); *G06K 7/1417* (2013.01); *G06Q 10/087* (2013.01); *G06Q 10/10* (2013.01); *G05B 2219/35013* (2013.01);
(Continued)

(58) Field of Classification Search
CPC ........ G05B 19/406; G05B 2219/35013; G05B 2219/2243; G05B 2219/31334; G05B 19/4184; G06F 16/242; G06F 16/284; G06F 16/9532; G06F 3/0482; G06K 7/1417; G06K 2007/10504; G06Q 10/087; G06Q 10/10; G06Q 10/20
See application file for complete search history.

(56) References Cited

U.S. PATENT DOCUMENTS 9,613,233 B1 4/2017 Landon et al.
10,860,825 B2 12/2020 Larson et al.
(Continued)

OTHER PUBLICATIONS

International Search Report with Written Opinion for related Application No. PCT/US2021/059904 dated Feb. 7, 2022 (17 Pages).

*Primary Examiner* — Charles R Kasenge
(74) *Attorney, Agent, or Firm* — MICHAEL BEST & FRIEDRICH LLP

(57) ABSTRACT

A method and system of performing a commissioning procedure for an industrial facility utilizing assets includes receiving, at an electronic processor of a computing device, a series of selections to obtain audit information. From the selections, the electronic processor generates a search query and transmits the search query to a web server and a relational database for execution of the search query to obtain audit information. The electronic processor receives the audit information and populates the audit information into a record including an asset location, and an open pass/fail decision status for each of the assets for display as a record on a user interface. The electronic processor receives a selection of pass or fail for the audit information of a first asset, transmits a pass/fail result to the relational database via the web server, and displays the pass/fail result.

19 Claims, 14 Drawing Sheets

(51) Int. Cl.
    *G06F 16/28*      (2019.01)
    *G06F 16/9532*    (2019.01)
    *G06K 7/14*       (2006.01)
    *G06Q 10/08*      (2023.01)
    *G06Q 10/087*     (2023.01)
    *G06Q 10/10*      (2023.01)
    G06F 3/0482       (2013.01)
    G06K 7/10         (2006.01)
    G06Q 10/20        (2023.01)

(52) U.S. Cl.
    CPC .. *G06F 3/0482* (2013.01); *G06K 2007/10504* (2013.01); *G06Q 10/20* (2013.01)

(56) References Cited

U.S. PATENT DOCUMENTS

| | | |
|---|---|---|
| 2006/0087402 A1 | 4/2006 | Manning et al. |
| 2015/0234381 A1 | 8/2015 | Ratilla et al. |
| 2017/0032281 A1 | 2/2017 | Hsu |
| 2017/0103103 A1 | 4/2017 | Nixon et al. |
| 2017/0343991 A1 | 11/2017 | Green et al. |
| 2017/0357253 A1* | 12/2017 | Kilpatrick .......... G05B 19/0428 |
| 2020/0117869 A1 | 4/2020 | Larson et al. |

\* cited by examiner

INDUSTRIAL COMMISSIONING PROCEDURES INCLUDING LOOP CHECKING

BACKGROUND

Embodiments relate to testing and commissioning of assets in industrial facilities. More particularly, some embodiments relate to methods of and systems for performing loop checking of assets in an industrial facility.

Loop checking and field instrument testing are performed in industrial and manufacturing facilities (for example, factories, oil refineries, and similar facilities). In general, the field sensing device and software that work together to make a process measurement or control a process variable are referred to collectively as a "loop." After initial installation and periodically during the equipment life, every loop is checked to ensure that it is performing properly. The term "loop checking" refers to this process. Even though loop checks may be performed after commissioning, a loop check is an example of a commissioning process. Loop checks are performed for various devices, including field sensing devices, and field control devices, such as control valves, variable speed control devices, and other devices. The loop check also determines wiring and cabling issues.

Simple checklists (whether paper or electronic) and similar text-only approaches are commonly used to assist operators and technicians in carrying out commissioning of industrial facilities. In many cases, industrial facilities include various piping, valves, equipment, and other components (sometimes referred to herein as "assets") spread over a large area (for example, five or more acres). Identifying labels and instrumentation diagrams are relied upon to find and control the various assets of the facility. Items on checklists are marked or "checked off" when various testing and measurement procedures are performed.

Another approach is paper loop check sheets. These paper loop check sheets include information regarding a status and operability of an asset and the loop check sheets are transferred from physical box to a different physical collection box as their status changes during a commissioning process. The paper loop check sheets are also susceptible to being misplaced. Further, the data on paper loop check sheets typically has to be manually entered into electronic spreadsheets and computer systems for processing and assessment.

Another approach includes having a field technician in wireless voice communication with a plant control operator perform a loop check of an asset. It is common when this approach is used that obtaining access to assets requires, for example, a scaffold, a lift, or personal protective equipment (PPE). Further, these locations sometimes do not have a wireless networking service available, such as WiFi wireless networking service. Some locations will only have intermittent cellular data coverage.

SUMMARY

A system lacking wireless networking service or cellular data coverage is not, in general, capable of synchronizing collected data from the field and the control room. Embodiments disclosed herein provide, among other things, systems that replace and perform new and different functions than prior loop checking and similar commissioning techniques. In addition, among other things, embodiments provide systems that are capable of operating in environments where wireless networking is not available, but data may still be collected and synchronized.

One embodiment provides a system for performing a commissioning procedure for an industrial facility utilizing assets that include asset identifiers for an industrial facility. The system includes a relational database having sets of tables; a web server in communication with the relational database; and an electronic processor in communication with the web server including a user interface (for example an administration user interface). The electronic processor is configured to: receive a series of selections for audit information; generate a search query based on the series of selections (or a scan); transmit the search query to the web server and the relational database for execution of the search query to obtain audit information; and receive the audit information, and populate the audit information into a record including, for example, an audit category, an asset location, an asset name, a date/time stamp, an answer/recommendation, and an open pass/fail decision status for each of the assets and display the record on the user interface. The electronic processor is further configured to receive a selection of pass or fail for an audit information of a first asset; transmit a pass/fail selection for the audit result of the first asset to the relational database for storage, and display the pass/fail selection on the user interface as an audit result; and recategorize the audit information from the pass/fail result for the asset in the relational database.

Another embodiment provides a method of performing a commissioning procedure for an industrial facility utilizing assets that include asset identifiers. The method includes receiving, at an electronic processor of a computing device, a series of selections to obtain audit information; from the selections, generating a search query with the electronic processor for obtaining audit information for the assets; transmitting the search query to a web server and a relational database for execution of the search query to obtain audit information; and executing the search query with at least another processor and the relational database. The method further includes receiving the audit information and populating the audit information into a record including an asset location, an asset name, a date/time stamp, an answer/recommendation, and an open pass/fail decision status for each of the assets; and providing the audit information to the electronic processor of the computing device to display the record on the user interface. The method further includes receiving, at the electronic processor, a selection of pass or fail for the audit information of a first asset; transmitting a pass/fail result for the first asset to the relational database via the web server for storage, and displaying the pass/fail result for the first asset upon the user interface; and recategorizing the audit information from the pass/fail result for the first asset in the relational database as an audit result.

Another embodiment provides a method of performing a commissioning procedure with an electronic processor for displaying a user interface, for an industrial facility utilizing assets that include asset identifiers. The method includes receiving, at an electronic processor of a computing device, a series of selections to obtain audit information; from the selections, generating a search query with the electronic processor for obtaining the audit information for the assets; transmitting the search query to a web server and a relational database for execution of the search query to obtain the audit information; and receiving the audit information and populating the audit information into a record including an asset location, an asset name, a date/time stamp, and an answer/recommendation for each of the assets. One of the audit results is a PCO audit result indicated as being provided by a plant control operator for a first asset, and another one of the audit results is a field audit result indicated as being provided by a field technician for the first asset.

Using certain disclosed embodiments, a digitized commissioning form can be viewed and completed using a portable smart device. A field technician will access the form by scanning an asset identifier, such as QR-coded tag provided for an asset and record the status of the asset on the form, while in wireless contact with a control room. In one embodiment, the field technician applies a test voltage to the asset. In a control room, a plant control operator will review the information collected from the completed forms displayed on a web-based client portal and verify the field condition with the asset status on a separate distributed control system (DCS) workstation display, and then update a record for that asset in the client portal with the appropriate status. If the field technician is in a location without connection, and their data is delayed, the plant control operator can separately obtain their own form and record the audit result. The plant control operator can then update the asset record from the field data when the connection is reestablished, and that field data appears.

The arrangement allows multiple teams of field technicians and plant control operators to quickly understand asset status, asset location, and general information, initiate the check out, and log if the asset passed a check, or if the asset needs attention (fails). All asset status changes are time, date, and user stamped and stored in a memory database. In one embodiment, a signal is either driven to an asset in the field, or from the asset in the field back to the DCS workstation. The plant control operator will verify the asset status by viewing the graphics displayed on the DCS workstation. The field technician will verify or generate signals from the actual field asset. Both the field technician and the plant control operator must sign off or approve that a loop is functional. Thus, both the field technician and the plant control operator provide a combined audit result that is a record that the asset has passed and is operational.

Other aspects of the various embodiments will become apparent by consideration of the detailed description and accompanying drawings.

BRIEF DESCRIPTION OF THE DRAWINGS

FIG. 5 is an initial graphical administration user interface display page for a loop checking procedure.

FIG. 8 is an administration user interface to display audit information for assets.

FIG. 11 is a graphical administration user interface portion for audit information for an asset.

FIG. 12 is the graphical user interface portion of FIG. 11 showing pass selected.

FIG. 13 is an export management administration user interface.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
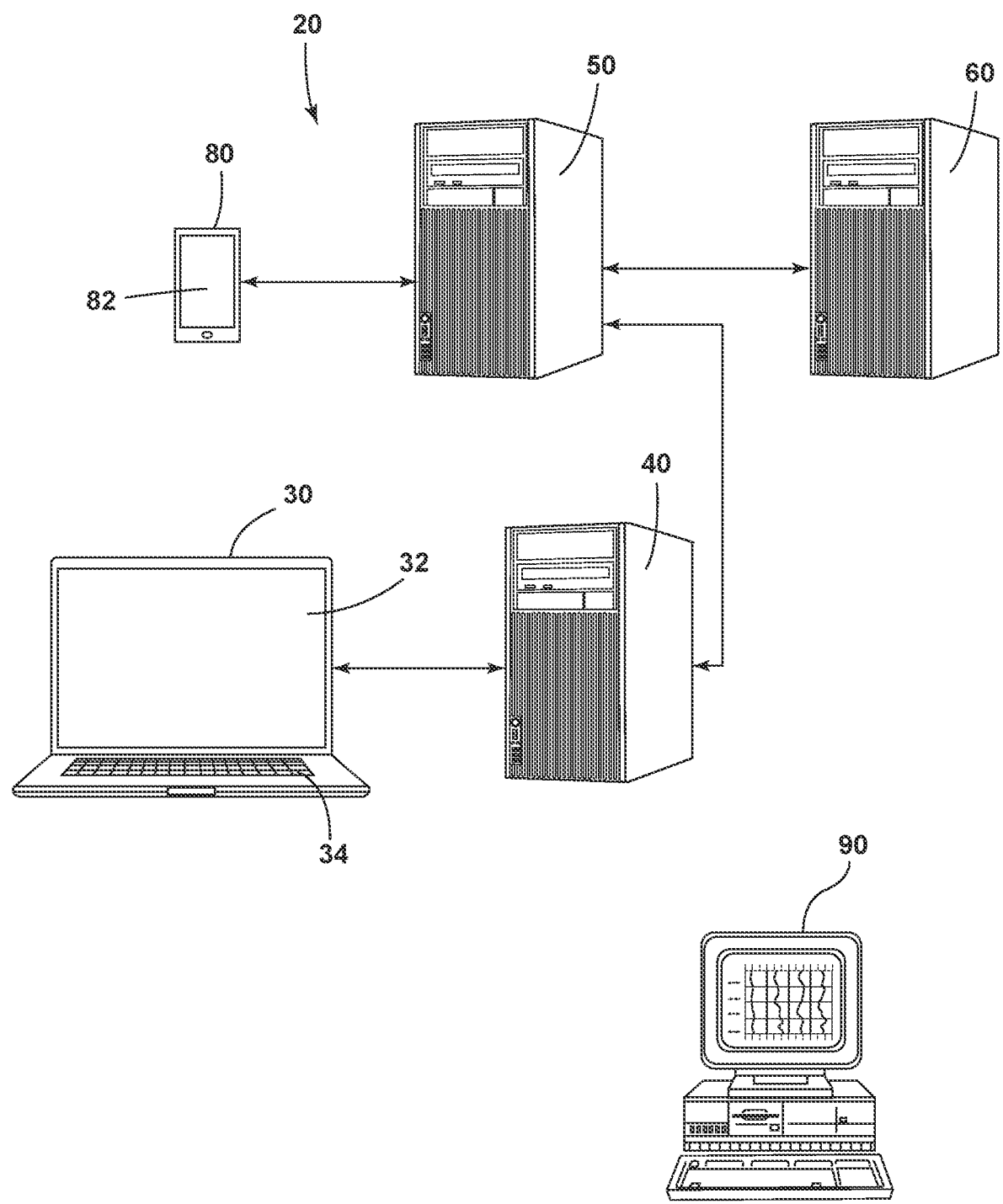
FIG. 1 shows a diagram of a network system for commissioning an industrial facility including a distributed control system (DCS) workstation.

FIG. 1 shows an interactive procedure system 20 that includes a computing device 30. The computing device 30 includes a display 32 and a keyboard 34 for receiving selections by a plant control operator. The computing device 30 may include other input and output devices and, in the example shown in FIG. 1, is a laptop type computer having an electronic processor for processing instructions. However, a tablet, or other type of computing device with an electronic processor is also contemplated, including a smart telephone or other computing device provided with, for example, a display, keyboard, and a mouse/tracking ball.

The computing device 30 connects to a web server 40. The web server 40 includes a web portal having a set of graphical user interfaces and commissioning process software for performing a commissioning interactive procedure for a plant control operator. The web server 40 is in communication with to a client application server 50. The client application server 50 is in communication with a database server 60. In one embodiment, the database server 60 includes sufficient memory for mapping or otherwise storing a piping and instrumentation (P&ID) diagrams for an industrial facility having a piping installation with piping and equipment, along with results and data for assets thereof. The client application server 50 includes an asset information management (AIM) application programming interface (API).

The assets are marked with asset identifiers, such as unique labels, stickers, tags with QR codes or bar codes, radio frequency identification (RFID) tags and other physical identifiers that are prepared for the various assets disposed at various locations in the industrial facility to provide warnings and information to a user. More specifically, warning and informational labels are created for the piping, valves, and other assets and for mounting at locations corresponding to the locations of those assets in the industrial facility. Further, details of such arrangements are disclosed in commonly owned U.S. Pat. No. 9,613,233 (the '233 patent), based on U.S. Applications. Ser. No. 15/231,260 filed Aug. 8, 2016, the disclosure of which is hereby incorporated by reference, in its entirety.

FIG. 1 shows a portable smart device 80 having a display 82, a camera (not shown), and communications components (also not shown) for communication with the client application server 50. In one embodiment, each portable smart device 80 is a tablet computer having an electronic processor, a touch screen type of display 82, one or more push buttons, and a camera capable of scanning images and obtaining photographs. The camera includes an auto-focus for automatically focusing on an image when a photograph is obtained. In one embodiment, the portable smart device includes a radio frequency identification (RFID) reader.

FIG. 1 shows a distributed control system (DCS) workstation 90. The workstation 90 receives information from various assets in an industrial facility, processes that information, and displays various conditions of the industrial facility. In operation a plant control operator (PCO) watches the workstation 90 to ensure that a plant is operating properly. In one embodiment, a pop-up display is provided by the workstation 90 when a voltage or other condition is detected for an asset. In some embodiments, the plant control operator is able to change conditions at remote locations.

Figure 2:
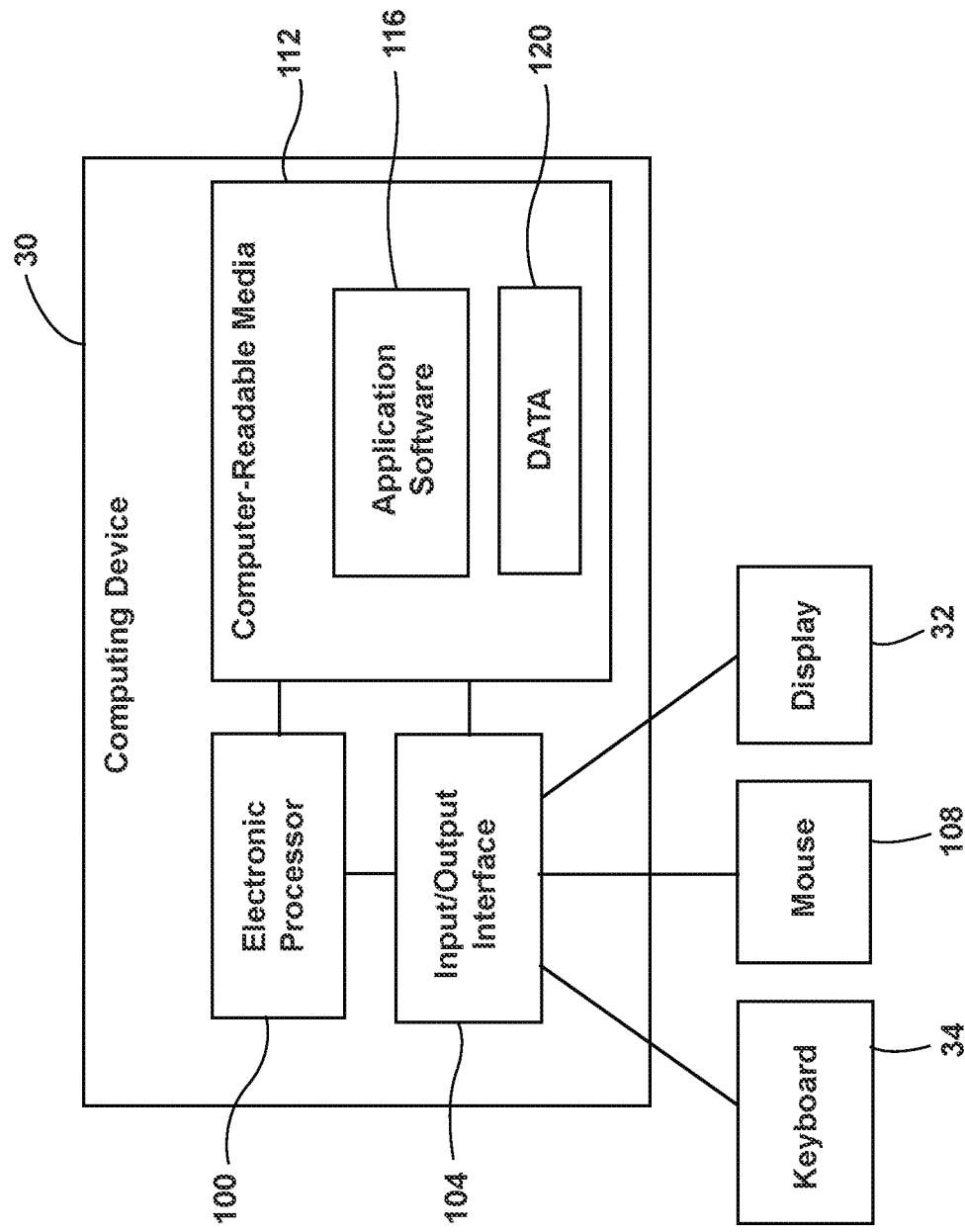
FIG. 2 shows a block diagram of a computing device.

FIG. 2 is a block diagram of the computing device 30. The computing device 30 includes a display 32 and a keyboard 34. In one embodiment, the computing device 30 includes an electronic processor 100, an input/output interface 104 in communication with the display 32, keyboard 34, and a mouse/track ball 108. The computing device 30 includes a transceiver (not shown) for wireless or wired communication with the web server 40. The computing device 30 includes a computer-readable media 112 that includes application software 116 and data storage 120.

The web server 40 shown in FIG. 1 includes one or more electronic processors, logic applications and data storage. Likewise, the client application server 50 includes one or more electronic processors, application software and data storage.

Asset Information Management Platform

Figure 3:
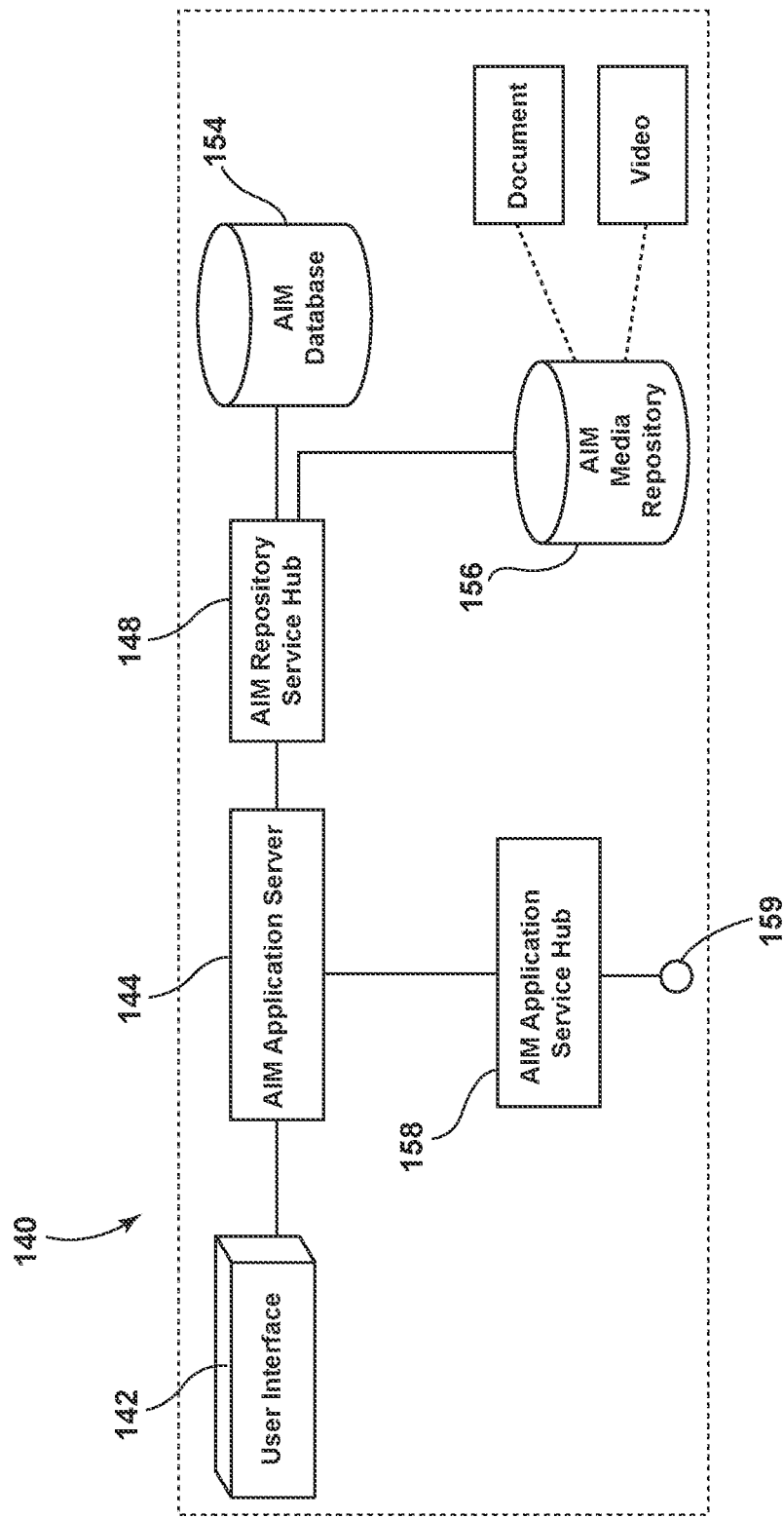
FIG. 3 is architecture diagram of an asset information management application platform.

FIG. 3 shows an asset information management (AIM) application platform 140 that includes an AIM user interface 142 and an AIM application server 144. The AIM application platform 140 includes an AIM repository service hub 148. The AIM repository service hub 148 shown in FIG. 3 links the AIM application server 144 to each of an AIM database 154 and an AIM media repository 156. An AIM application service hub 158 shown in FIG. 3 connects to the AIM application server 144 and includes an asset data provider 159 for two-way communication with other devices. The AIM application service hub 158 also enables synchronization with other devices.

In one embodiment, the AIM application server 144 hosts a graphical user interface containing multiple pages. The AIM user interface 142 allows an administrator to control the settings of the AIM application server 144 and to receive associated asset media for specified facilities for storage by the AIM application platform 140. In one embodiment, the AIM application platform 140 is a cloud-based arrangement. In another embodiment, the AIM application platform 140 is an application platform used to capture and manage all asset related information for multiple purposes including commissioning, training, reference, etc.

The AIM media repository 156 securely manages video, photographs, images, and document content. The AIM media repository 156 is also scalable based on the needs of the AIM application platform 140.

Figure 4:
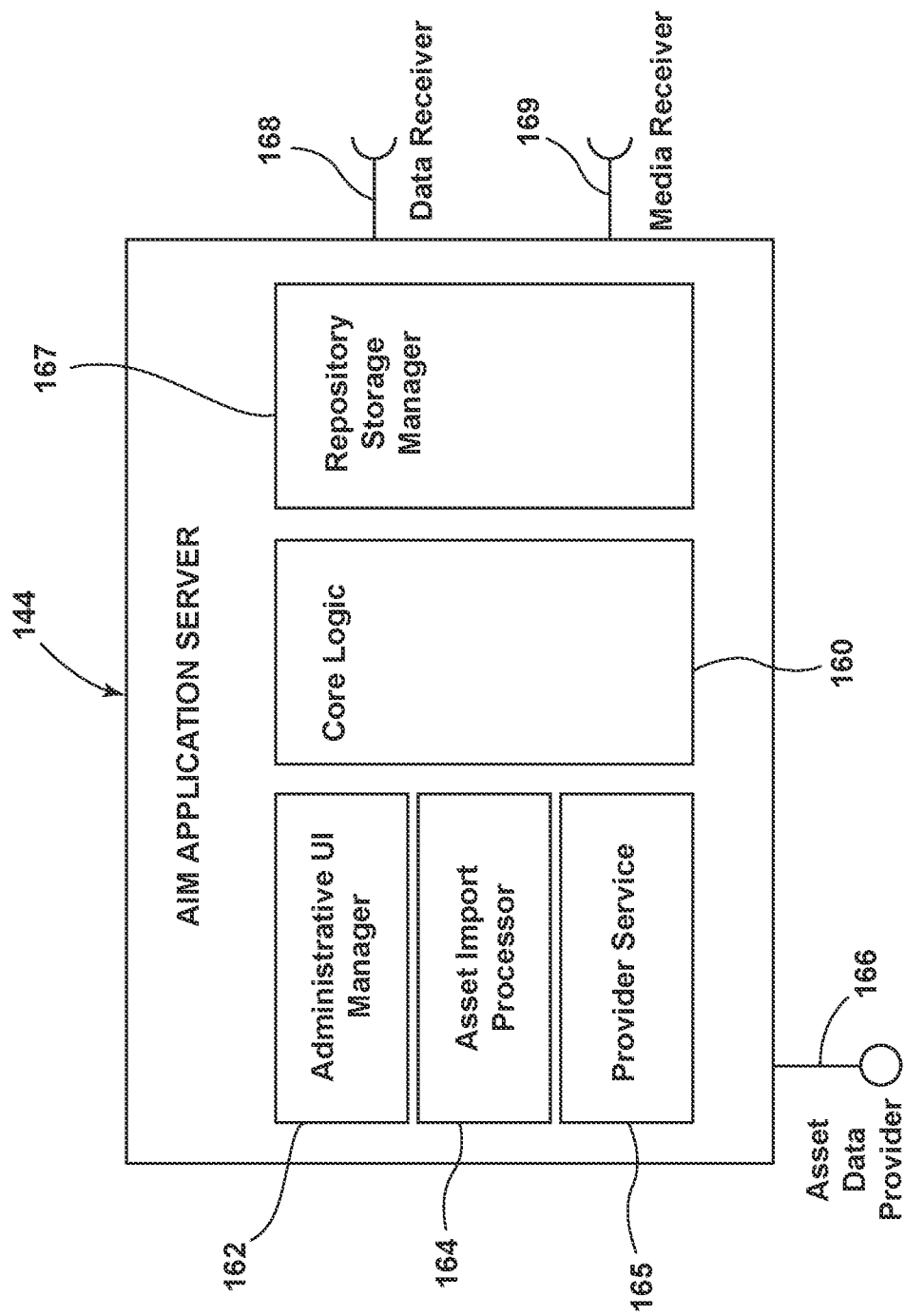
FIG. 4 is a block diagram of the asset information management application server shown in FIG. 2.

FIG. 4 is a block diagram of one embodiment for the AIM application server 144 shown in FIG. 3. The AIM application server 144 includes core logic 160 for performing processing operations and an administrative user interface (UI) manager 162 for communicating with the user interface 142 shown in FIG. 3. Further, the AIM application server 144 includes an asset import electronic processor 164 for processing asset information provided thereto. The AIM application server 144 includes a provider service 165 for communicating with the AIM application service hub 158 shown in FIG. 3 via an asset data provider 166. Finally, the AIM application server 144 includes a repository storage manager 167 for communicating with the AIM database 154 via the data receiver 168 and the repository service hub 148. Further, the repository storage manager 167 communicates with the AIM media repository 156 via the media receiver 169 and the repository service hub 148.

While shown as blocks in FIG. 4, in some embodiments the core logic 160, the AIM administrative UI manager 162, the asset import electronic processor 164, the provider service 165, and the repository storage manager 167 are programs executable by an electronic processor of the AIM application server 144. The data receiver 168 and the media receiver 169 enable both two-way communication and two-way data transmission with the respective AIM database 154 and the AIM media repository 156.

In some embodiments, the AIM application programming interface (API) is provided with the client application server 50. In another embodiment, the AIM application server 144 is combined with the client application server 50. In other embodiments, the AIM application server 144 is combined with the database server 60. Finally, various functions of the AIM application server 144 can be performed on multiple servers having electronic processors, including cloud servers.

Portable Smart Device

A portable smart device 80 having a display and a camera (not shown) scans an asset for commissioning thereof in a facility. The portable smart device 80 detects the asset and displays asset information, such as location, asset identification number, and other asset information on a display of the portable smart device 80. When a loop checking form is selected by an input from a field technician, the loop checking form 190 shown in FIG. 5 is displayed as part of a graphical user interface on the portable smart device 80.

In operation, the asset or loop name fills in automatically. Additional details such as location, I/O type, voltage, etc. automatically fill into the boxes 192, 194 shown on the left side of FIG. 5, appropriate to the specific Loop or asset. User Name, Date, and Time are automatically filled in based on the field technician/user logged into the portable smart device 80, and the current date and time are displayed. The only action the user need to take on the form is to select the appropriate button for PASS/FAIL selection entry, and enter a comment if necessary. Actuation of a button on the portable smart device 80 provides a wireless connection to a network to provide the form to the client application server and the database server 60.

Figure 5:
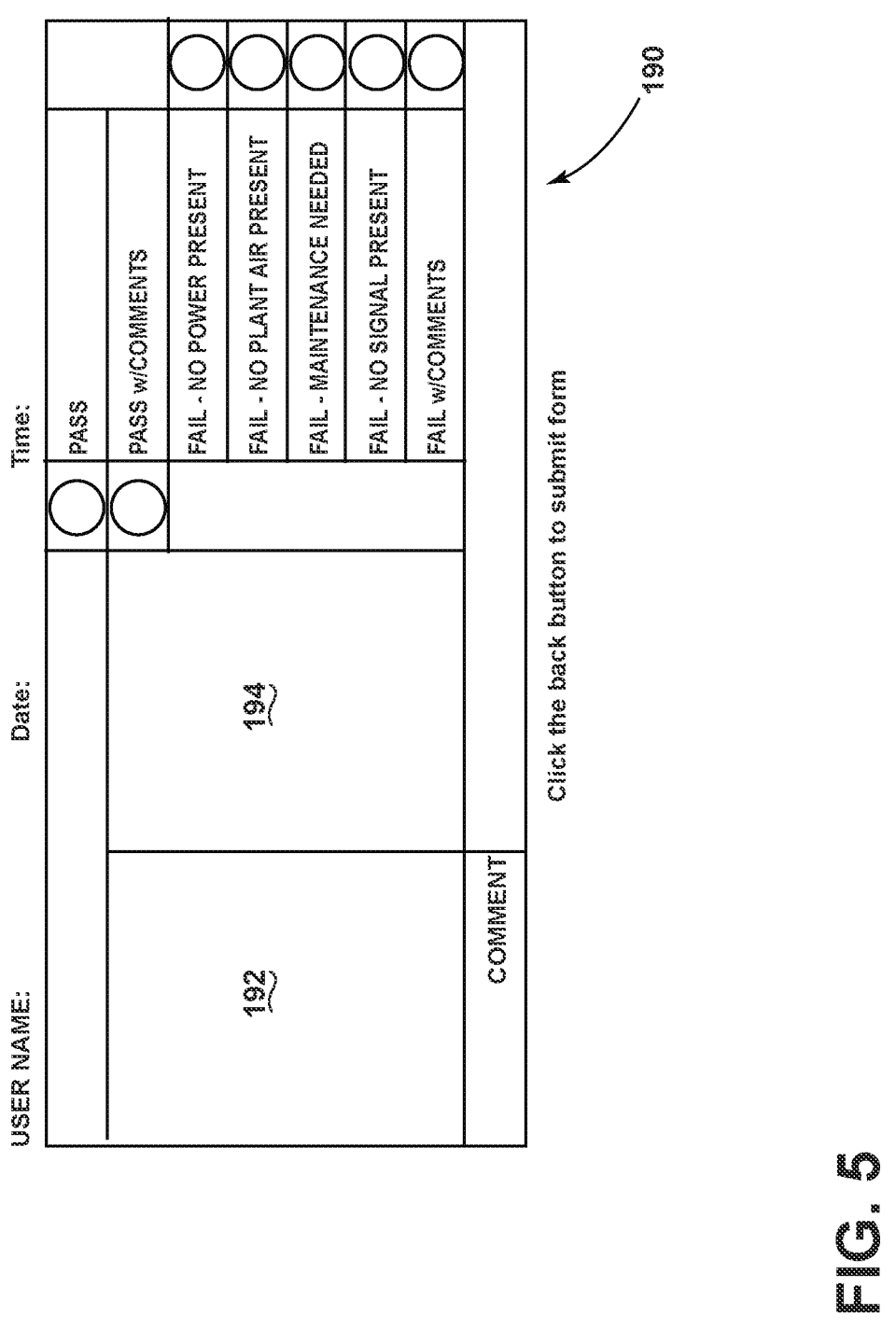

In one embodiment shown in FIG. 5, the pass/fail selection entries for a user are 1) PASS, 2) PASS with comments, 3) FAIL—No power present, 4) FAIL—No plant air present, 5) FAIL—Maintenance needed, 6) FAIL—No signal present, 7) FAIL with comments. Other selection arrangements with fewer or more choices are contemplated. Other assets will have other failing conditions.

In one embodiment, a touch screen receives an input to select the status for the asset on the portable smart device 80. Thereafter, actuating a button on the portable smart device 80 submits the loop checking form 190. The loop checking form 190 is wirelessly transmitted to the client application server 50.

In an instance where there is no wireless communication available between the portable smart device 80 and the client application server 50, the portable smart device 80 stores the loop checking form 190 until there is a communication link with the client application server 50. Thereafter, the loop checking form or forms are transmitted to the client application server 50.

Relational Database Table Diagram

Figure 6:
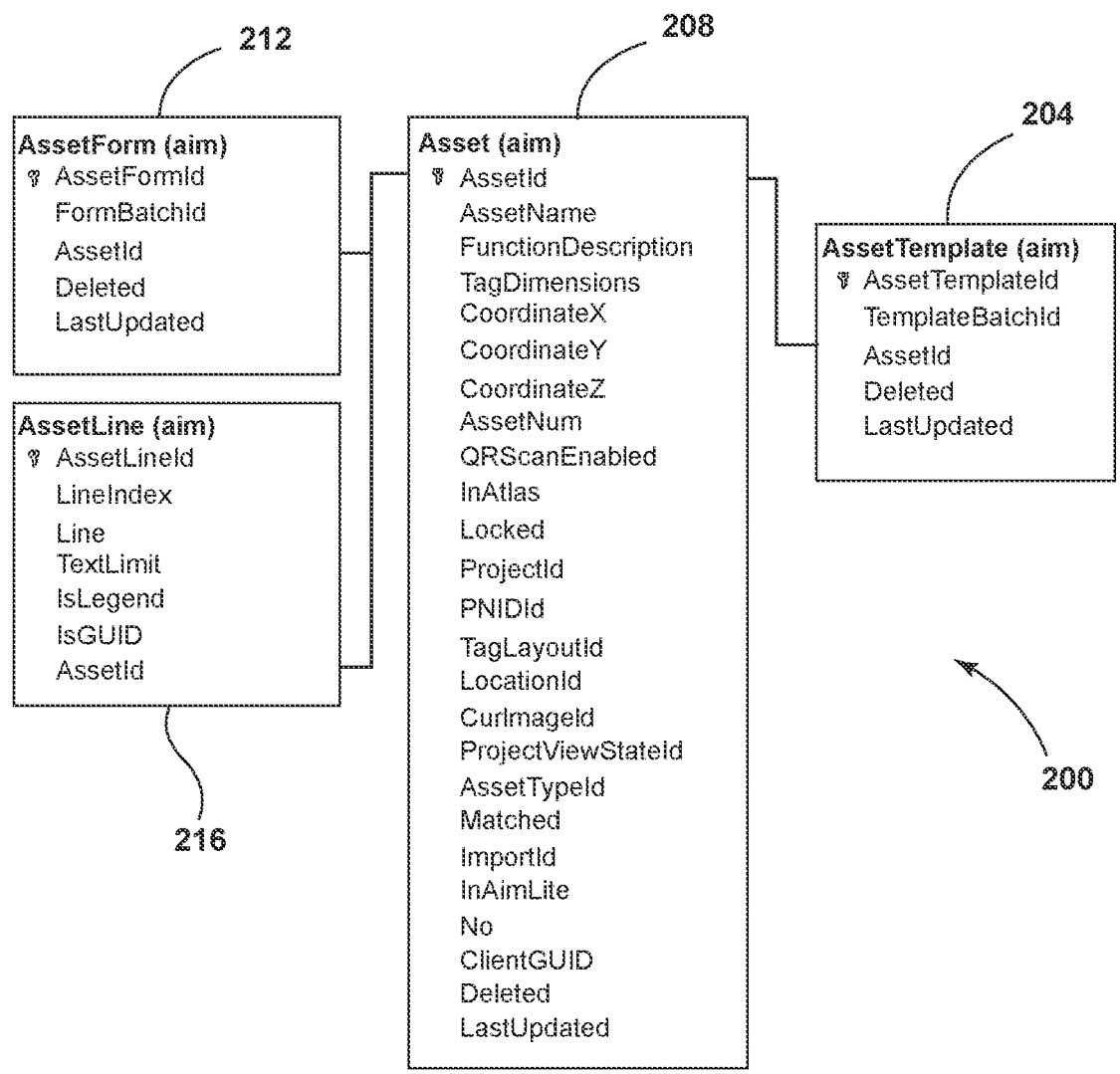
FIG. 6 is diagram of a set of tables for a relational database.
Figure 6A:
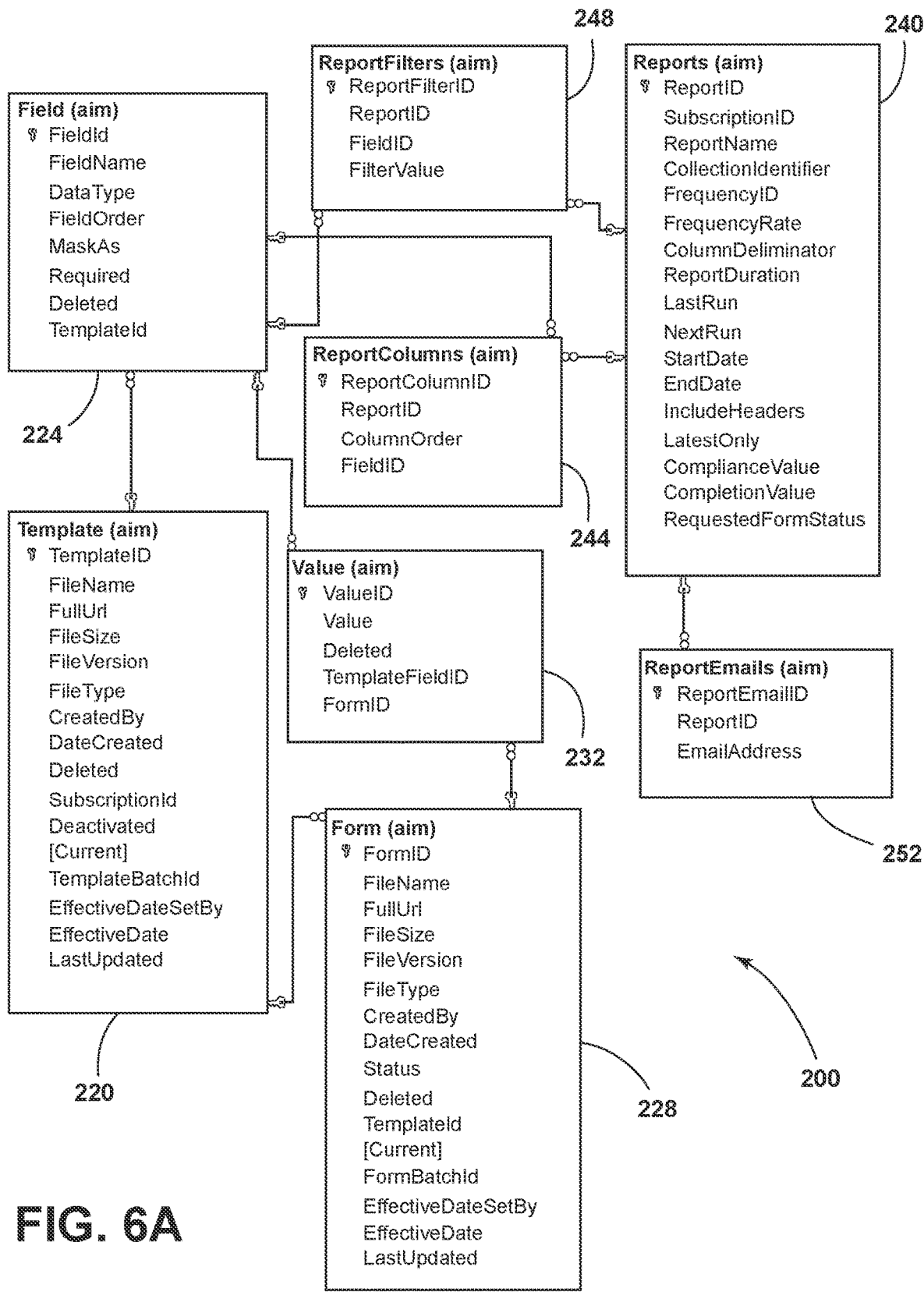
FIG. 6A is diagram of another set of tables for a relational database.

FIG. 6 and FIG. 6A show a relational database 200 associated with the database server 60 shown in FIG. 1. The relational database 200 is a condensed version of the actual database provided for purposes of discussion. Unnecessary tables are omitted or condensed for ease of description. In one embodiment, the relational model is represented by the Structured Query Language (SQL). The process of creating a logical database design using this model uses a methodical approach known as normalization. The goal of normalization is to ensure that each elementary fact is only recorded in one place, so that insertions, updates, and deletions automatically maintain consistency.

The relational database 200 shown in FIG. 6 includes multiple tables with rows, and each table having a unique key. The asset template table 204 includes a primary key "AssetTemplateID" and additional columns are listed. In one embodiment, the asset template table 204 is utilized to obtain a loop check form as shown in FIG. 5. The asset template table 204 is linked to the asset table 208 shown in FIG. 6. The asset table 208 includes a primary key "AssetID" that is associated as a foreign key in the asset template table 204. Other column names in asset table 208 including "AssetName," "AssetNum," and XYZ coordinates.

Another AssetForm table 212 is linked to the Asset table 208 and an AssetLine table 216. The AssetForm table 212 has "AssetFormID" as a primary key and "AssetID" as a foreign key, among the columns.

The AssetLine table 216 shown in FIG. 6 has "AssetLineID" as a primary key. The AssetLine table 216 and the AssetForm Table 212 assist in linking information to assets being checked. "AssetId" is a foreign key provided for both AssetForm table 212 and AssetLine table 216.

For collection information, the relational database 200 includes a Template table 220 shown in FIG. 6A that includes a primary key named "TemplateId" and additional columns. The template table 220 is linked to a Field table 224 having as a primary key "FieldId" and linked to a Form Table having "FormId" as a primary key. The Field table 224 and the Form table 228 are linked to a Value table 232. The value table has a primary key named "ValueId" and additional columns. The Value table stores various values for any field on a form. The Template table 220, the Field table 224, the Form table 228, and the Value table 232 act to collect or store information for the various assets.

A Reports table 240 shown in FIG. 6A includes a primary key named "ReportID" and additional columns. The Reports table 240 is linked to a ReportColumns table 244, and a ReportFilters Table 248. The ReportColumns table 244 has a primary key named "ReportColumnID" and columns including foreign keys. The ReportFilters table 248 has a primary key named "ReportFilterID" and additional columns including foreign keys. The Reports table 240 is also linked to a ReportEmails table 252 that includes a primary key named "ReportEmailID" and additional columns. The Reports table 240, the ReportColumns table 244, the ReportFilters table 248, and operate, in conjunction with the other tables storing data to generate reports The ReportFilters table 248 shown in FIG. 6A assists in filtering the assets and data thereof in order to generate selected reports, described in detail below.

While no links are shown between the tables of FIG. 6 and FIG. 6A, that does not mean that data or information does not get moved between the tables in the database 200. The series of primary keys and foreign keys enable the collection and storage of data at one data location for audit information for each asset.

In operation, a search query is entered by a user at the computing device 30. The electronic processor 100 of the computing device 30 provides the search query via the web server 40 to the client application server 50 and the database server 60. The search query is executed by one or more electronic processors 100 located in one or more of the web server 40, the client application server 50 and/or the database server 60 and the search results are populated and returned to the computing device 30 for display as audit information, results or other data.

Portable Smart Device

A portable smart device 80 scans an asset identifier, such as a QR-coded tag for an asset in a remote area and accesses the loop check form shown in FIG. 5. The portable smart device 80 records a status of the asset on the form entered by a field technician while in radio contact with a plant control operator. The portable smart device 80 wirelessly transmits the loop check form including a status of the asset to the client application server 50 remotely as shown in FIG. 1. The loop check form is processed to populate audit information that is stored in the relational database 200 for the scanned asset in real-time or on a delayed basis. Moreover, the information on the loop check form is provided to a plant control operator using the computing device 30 via a web server 40 for performing a loop check procedure.

Operation of Commissioning System

Figure 7:
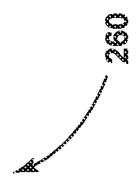
FIG. 7 is an administration user interface for assets.

Initially, a plant control operator (PCO) in a control room logs onto the client interactive procedure system 20 with the computing device 30 using a username and password. Of course, the relational database 200 stores the operator data in relation to their use of the client procedure system 200. Upon completion of a login, an asset screen providing a list of assets appears as shown in an administration user interface 260 in FIG. 7. For each asset, there is a unique asset name/identifier, a functional description, a location name, a building name, an optional document counts of corresponding documents for each asset as shown in FIG. 7. Besides a list of assets, a left column providing a list of other graphical administration user interfaces is provided. The list includes "Export Management," "Forms," "Collection Forms," and "User Management." The Assets administration user interface 260 is one of a set of administration user interfaces that act as a web-based client portal.

Thereafter, a track ball, mouse, touchscreen, or other input mechanism is used by a PCO operator to select "Audit Results" in the left-hand column using, for example, a mouse pointer controlled by a track ball or mouse. The electronic processor 100 of the computing device 30 then advances to an Audit Results administration user interface 300 as shown in FIG. 8 as follows.

Audit Results User Interface

Figure 8:
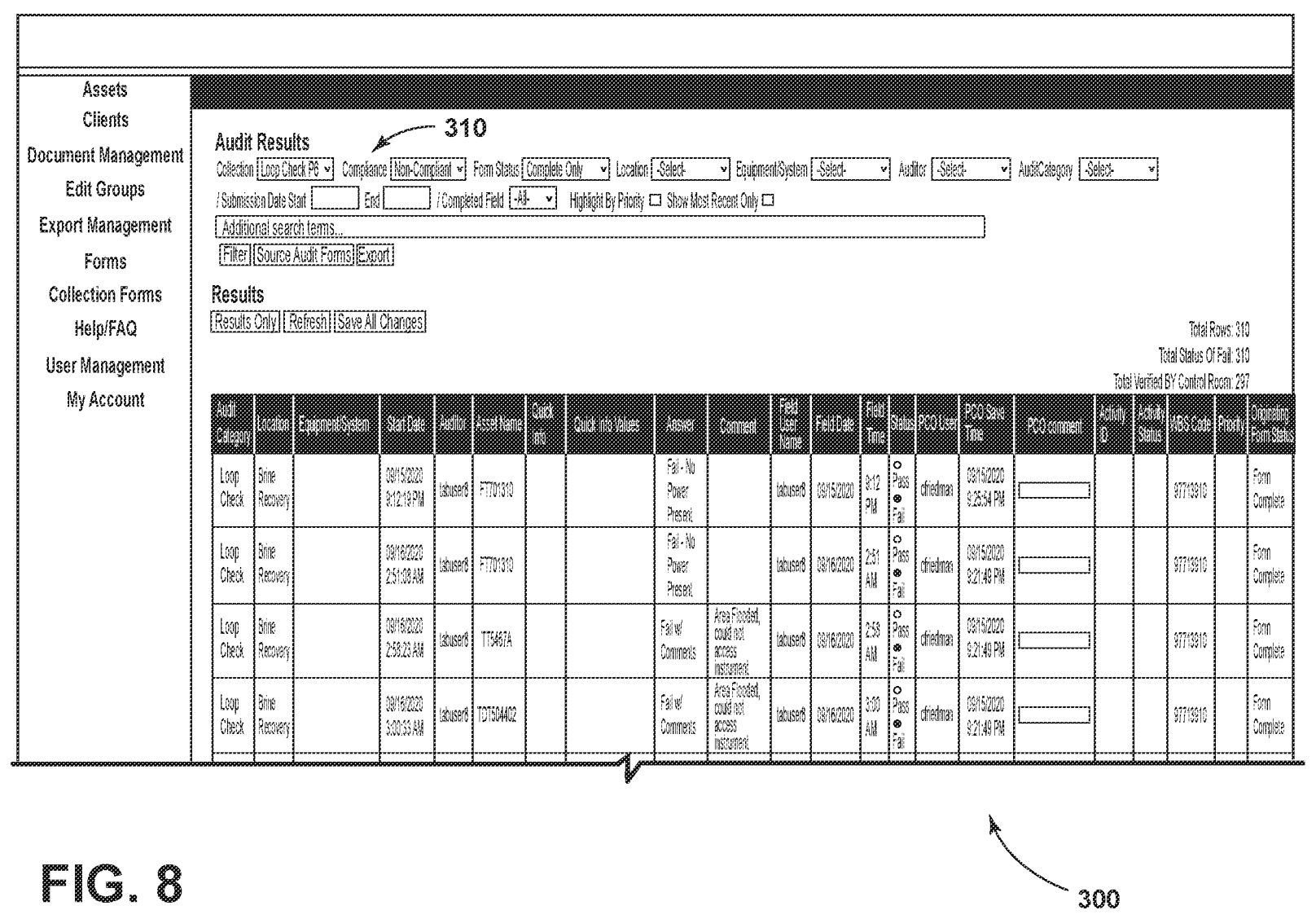

The Audit results user interface 300 shown in FIG. 8 includes a table form for the audit information includes in a row, Audit Category, Location, Equipment/System, Start Date (date/time stamp), Auditor, Asset Name, Quick info, Quick info Values, Answer(Answer/Recommendation), Comments, Field User Name, Field Date, Field Time, Status, PCO user (operator), PCO comments, Activity ID, Activity Status, Code, Priority, Organizing Form Status. Obviously, some of the fields have no data entries, and data is not always required therein. Comments can be entered by both a PCO operator and a field technician in different sides along the row. This page of audit information can be filtered to show the results in several ways, including a list of any audit results that are still in a fail state (taking into account only the most recent results for any particular loop being checked).

In the example of an Audit Results user interface 300 shown in FIG. 8, the Audit Category is Loop Check for each asset. More importantly, the Compliance category is "Non- Compliant" in the series of drop-down selections 310. Thus, only assets with a Fail Status are displayed in FIG. 8. The location listed is Brine Recovery for each asset. Other categories are contemplated. The start date and time is provided, along with the name of an auditor that is typically the same as the name of a field technician. The field technician is also listed as a field user name. Further, a field date and field time are automatically provided. A comment section for optional comments is provided for a field technician.

The status provided on the user interface 300 shows Pass/Fail with circles for selection by a plant control operator. In the example illustrated in FIG. 8, each of the assets previously has been indicated as a fail by the plant control operator. Thus, the records are stored as completed forms with a noncompliant or fail status in the relational database 200.

FIG. 8 also shows a series of drop-down selections 310 in the Audit Results user interface 300 for a plant control operator to obtain a desired list of assets. More specifically, the first drop down box is for a collection. The Collection drop down box includes a list of choices, such as "all," "loop check," and "junction box." Other input selections are contemplated. A second Compliance drop down box provides selections, including "All," "Yes," and "No." A Form Status drop down box provides selections including "Complete," "In Progress," and "Complete and In Progress." The term "In Progress" is defined by the field technician not completing all the necessary checks for an asset. For example, if junction box connections are not all completed for a junction box asset, the value "In progress" is set for the particular junction box asset. Thus, an "in progress" compliance value indicates incomplete audit information from a portable smart device 80.

Another Location drop down box shown in FIG. 8 allows section of a specific location, such as brine recovery, building 1, building 2, or other named locations. Another drop down box labeled Select Equipment/System can be set by a user as a combination, such as "Loop Checking and Air Handling." Other variations or combinations can also be provided. The Auditor drop down box is directed to an auditor of previous results. The Audit Category drop down box can be user defined for specific searches for an individual plant control operator or other user.

The web portal for the Audit Results user interface has standard web security and access roles, user management, allows access by defined groups of assets if desired, and has many other features that relate to adding and managing the additional documentation that can come up when a specific loop is scanned in the field.

FIG. 8 shows a Completed Field drop down box on the user interface 300. The Completed Field drop down box has for selections "All," "Has a value," and "blank," which is the condition until either Pass or Fail is selected by the computing device 30 in response to an input from a plant control operator. Ability to filter by "Completed Field" allows for the display of results that either still need to be updated by the control room, or have already been updated, or both.

Comments can be entered from both sides. The administration user interface 300 includes a page that can be filtered to show the results in several ways, including a list of any audit results that are still in a fail state (taking into account only the most recent results for any particular loop being checked).

The user interface 300 shown in FIG. 8 includes a "Highlight by Priority" selection that results in red, yellow, or other colors for the displayed assets to show a higher priority than other assets. FIG. 8 also shows a "Show Most Recent Only" selection that results in only the most recent record of audit information or audit results for an asset being displayed. This selection is useful to prevent a long list of the record history for an asset from being displayed. Below in FIG. 8 is an "Additional search terms" section that also allows character searching of the assets.

Finally, the user interface 300 shown in FIG. 8 includes three control input selections, namely, "filter," "Source Audit Forms," and "Export."

The "filter" selection provides a new list of audit information or audit results as a result of the above described series of selections filtering the audit results of the assets. There are various examples of filter findings for a user or PCO operator.

Upon selecting Audit Results with a mouse pointer or other input mechanism, a Collection from the drop-down list must be selected. The filter returns all data for Compliance, Locations, Equipment/System, Auditor, AuditCategory, Submission Date Start, End, and Completed Field for the selected collection, such as loop check.

The Compliance field returns all data when All is selected. The Compliance field will return only data where the answer was a Yes when Compliant is selected. The Compliance field will return all other data that does not contain Yes for the answer (i.e. Off, N/A, No, etc.) when Non-Compliant is selected as shown in FIG. 8.

When Collection and Location are selected, the filter will return only a record of audit information for that location from the relational database 200. When Collection, Compliance (Non-Compliant, Compliant, or All), and Location are selected the filter will return only the record of audit information from the relational database 200 for assets that match the Location, the Collection, and the Compliance values that were selected.

When Collection, Compliance (Non-Compliant, Compliant, or All), Location, and Equipment/System are selected the filter will return only the record of audit information from the relational database 200 for assets that match the Collection, the Compliance, the Location and the Equipment/System values selected by a user.

When Collection and Auditor are selected the filter will return only the record of audit information for the Collection and the Auditor selected from the relational database 200. If the Compliance value is changed to further filter the data, the record of audit information will return for the Collection, the Compliance selected, and the Auditor.

When Collection and Submission Date Start are selected the filter will return data for the Collection and Submission Date Start. When Collection and Completed Field Has Value selected the filter will return only the record of audit information that has some value in the Completed Field.

When Collection and Audit Category are selected the filter will return only the record of audit information for that Collection and the selected Audit Category.

All the filters work together to narrow or expand the search categories when using the Filter button. Above are just a few examples of the mix and match approach to utilizing the Filter functionality.

Returning to FIG. 8, the "Source Audit Forms" icon enables a plant control operator to generate an asset record. An "Export" input selection permits a plant control operator to export audit information to another user via a message or into storage within a report file.

Operation—Audit Results User Interface

Operation of the Audit Results user interface 300 shown in FIG. 8 for commissioning an industrial facility utilizing assets that include asset identifiers is as follows. The electronic processor 100 of the computing device 30 receives a series of drop-down selections 310 or default selections to obtain audit information. In one embodiment, the user interface 300 is provided in a plant control room for use by a PCO operator.

The electronic processor 100 generates a search query from the drop-down selections. The electronic processor 100 of the computing device 30 transmits the search query to a web server 40 and a relational database 200 for execution of the search query to obtain audit information. The web server 40 provides the filter query or search query based on the drop-down selections to the client application server 50 and the database server 60.

The search query is executed by at least another of one or more additional electronic processors 100 located in one or more of the web server 40, the client application server 50 and/or the database server 60 that includes the relational database 200. In one embodiment, executing the search query with at least another processor 100 and the relational database 200 occurs.

The electronic processor 100 of the computing device 30 receives the audit information and populates the audit information into a record including an audit category, an asset location, an asset nadefineme, a date/time stamp, an answer/ recommendation, and an open pass/fail decision status for each of the assets and displays the record on the user interface 300.

The electronic processor 100 receives a selection of pass or fail for the audit information of a first asset from an input of a mouse pointer selected by a PCO operator. The electronic processor transmits a pass/fail result for the first asset to the relational database 200 via the web server 40 for storage, and displays the pass/fail result as an audit result for the first asset upon the user interface 300. The recategorized pass/fail result is processed and stored in the relational database 200 for the first asset.

In one embodiment in a control room or elsewhere, a plant control operator reviews the information collected from the completed loop check form through a web-based client portal that includes the Audit Results user interface 300 shown in FIG. 8. The field condition of a corresponding asset status is verified by the plant control operator in view of indicia displayed as graphics on the separate DCS workstation 90. The user interface 300 then receives the Pass or Fail result for the asset in the Status row as selected by a mouse pointer and cursor used by the plant control operator. The audit information for the asset is updated as an audit result in the client portal and the relational database 200 with the appropriate status.

The process allows multiple teams of field technicians and plant control operators to quickly understand asset status, location, and general information, initiate the check out, and log if the asset passed check, or if the asset needs attention. All status changes will be time, date, and user stamped and stored in the client portal and the relational database 200. The status changes can be displayed on the Audit Results user interface. A signal is either driven to the asset in the field, or from the asset in the field back to the DCS workstation. A plant control operator will verify the asset status on the computing device 30 from the graphics displayed at the DCS workstation 90. The field technician will verify or generate signals from the actual field asset. Both a plant control operator and a field technician must sign off that the loop is functional.

The commissioning process will be operating simultaneously on multiple portable smart devices 80 and multiple computing devices 30, such as laptop and desktop personal computers. The system is able to handle multiple users, including the ability to filter information and results in the client portal to easily find specific records for specific assets. In one embodiment, up to 6 DCS workstation operators can access the client portal for the 300 "Audit Results" concurrently, and 6 field contractors.

FIG. 8 shows an Audit Results user interface 300 used in a control room, to allow a plant control operator to review the real-time information from the field and enter their pass/fail result and any comments. The results in FIG. 8 show the field technician that completed the form and the date, as well as the plant control operator and the date either passed or failed.

In one embodiment, the search query for obtaining the audit information includes Completed Field with a value "blank" to obtain only audit information with an open pass/fail decision status, and an "in progress" compliance value indicates incomplete audit information.

The web portal that includes the Audit Results user interface 300 has standard web security and access roles, user management, allows access by defined groups of assets if desired, and has many other features that relate to adding and managing the additional documentation that can come up when a specific loop is scanned in the field.

Commissioning (Loop Check Procedure) Procedure System—PCO Example

In the event there is no data transmission link between a field technician and a plant control operator in a control room, synchronized audit information can be obtained and audit results for a commissioning procedure can still be completed.

Figure 9:
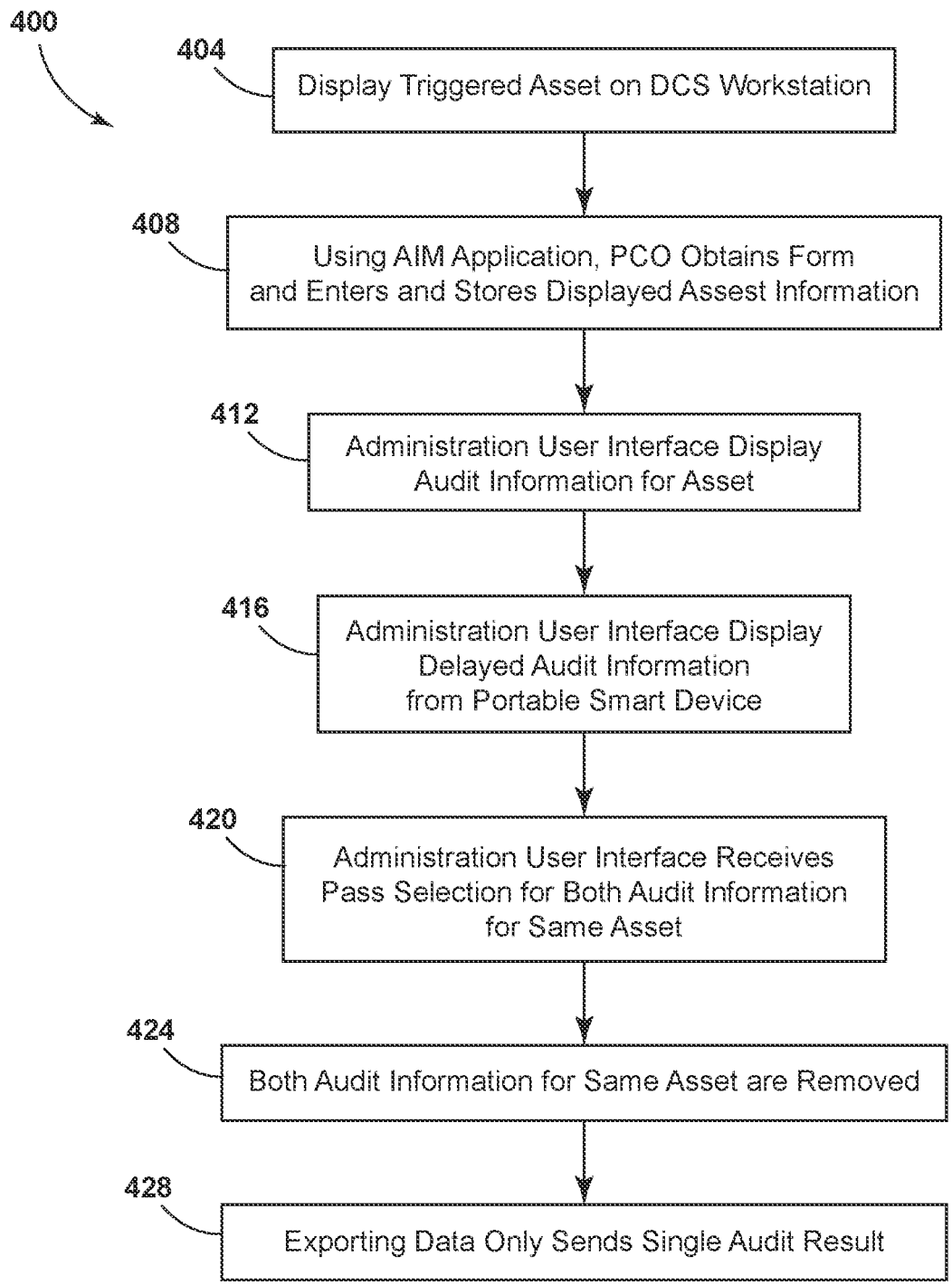
FIG. 9 is flowchart for operation of the audit information with the user interface.

FIG. 9 is a flowchart 400 showing an example of how such a commissioning procedure occurs at a control room. At remote asset, a field technician with a username "msitestadmin" may optionally attempt to communicate by radio with a PCO operator in a control room (optional). Thereafter, a portable smart device 80 scans an asset with asset name ZSC201131 and obtains a loop checking form 190 as shown in FIG. 5 having a username, a date, and a time 3:41 automatically filled in on the display 82. The field technician applies voltage to asset ZSC201131, observes the result, and completes the form shown in FIG. 5 by marking PASS as a result on a touchscreen. Due to lack of a wireless connection with the client application server 50 caused by interference or obstructions, the form for asset ZSC201131 is not received by the client application server.

Step 404 of the flowchart 400 occurs when a pop-up message or other information that asset ZSC201131 is triggered is displayed on DCS workstation 90, possibly along with a radio contact from field technician. The result is noted by a plant control operator with, in one example, the user name "aamarkinsi." No result appears on an Audit Results user interface 300 displayed on the display 32 of the computing device 30.

As no result is synchronized to the Audit Results user interface 300, at step 408 the plant control operator uses an AIM application stored on a different portable smart device 80 or switches to a different interface/window on the computing device 30 to obtain a loop checking form, such as the form shown in FIG. 5. The plant control operator enters, for example, asset name ZSC201131, "Loop Check," "Brine Recovery," a comment "Control room placeholder" manually and selects Pass with comments. The manually completed form is transmitted to the client application server 50 for processing and storage in the relational database 200. The field user name, the auditor name, and the date and time are automatically filled. The manually completed form is provided to the client application server 50 and processed to populate PCO audit information that is stored in the relational database 200 for purposes of operation.

Figure 10:
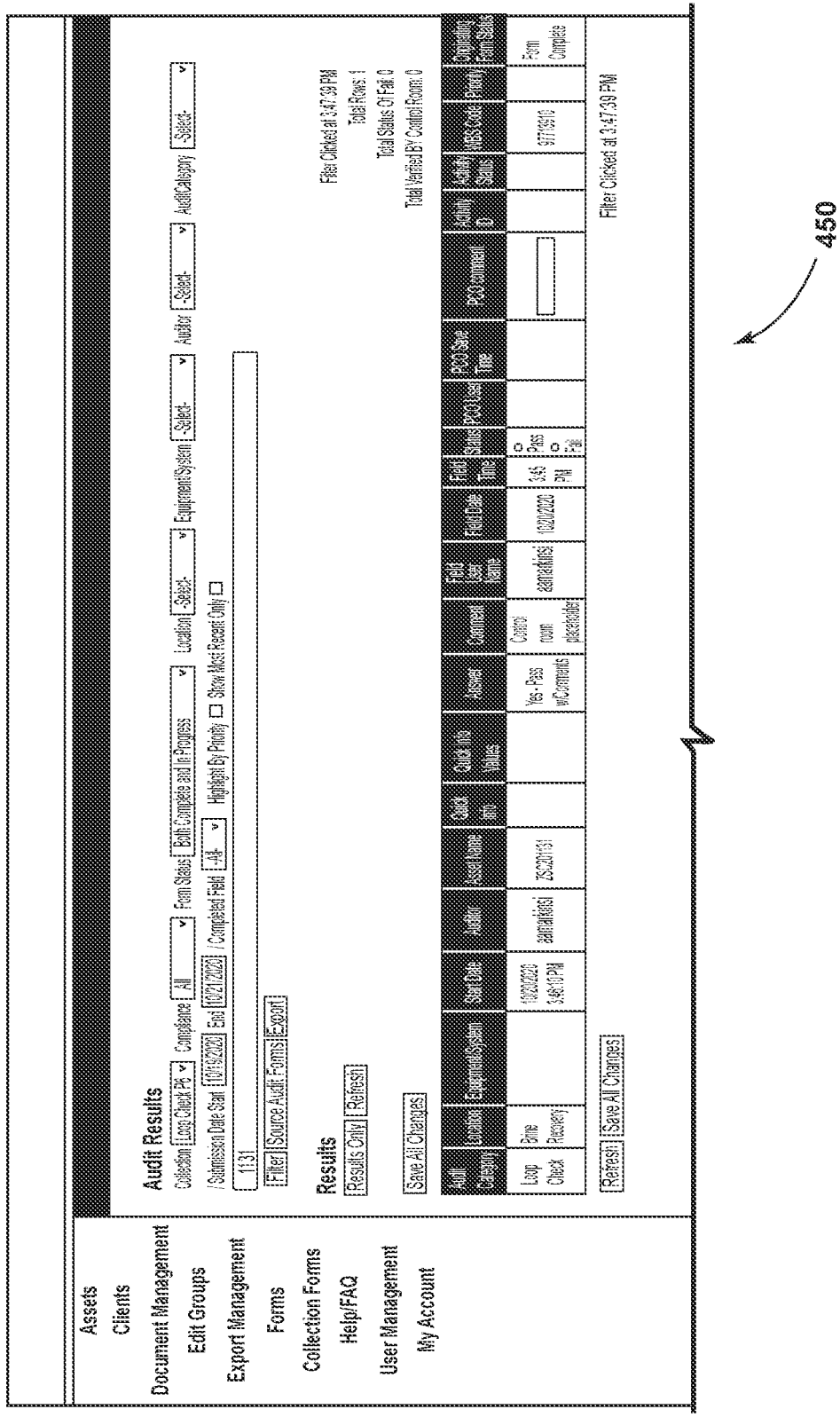
FIG. 10 is an administration user interface for audit information created by a PCO.

At step 412, a graphical user interface 450 displays the PCO audit information for asset ZSC201131 on the computing device 30 for use by a plant control operator as shown in FIG. 10. While audit information for a single asset is shown in FIG. 10, audit information or records can be displayed for a plurality of assets.

At a later time, the portable smart device 80 of the field technician is moved to an area with a wireless connection, and the loop check results stored therein are synched from the portable smart device 80 to the client application server 50 and the relational database 200. The field audit results also include the extra information, such as time, date, asset name ZSC201131, field username, which had automatically been populated when the loop check form was opened for the scanned asset as shown in FIG. 5. The delayed audit information for asset ZSC201131 is stored in the relational database 200. At step 416, a graphical user interface portion 460 shown in FIG. 11 populates both the PCO audit information and the field audit information for asset ZSC201131 for display on the computing device 30.

Figure 11:
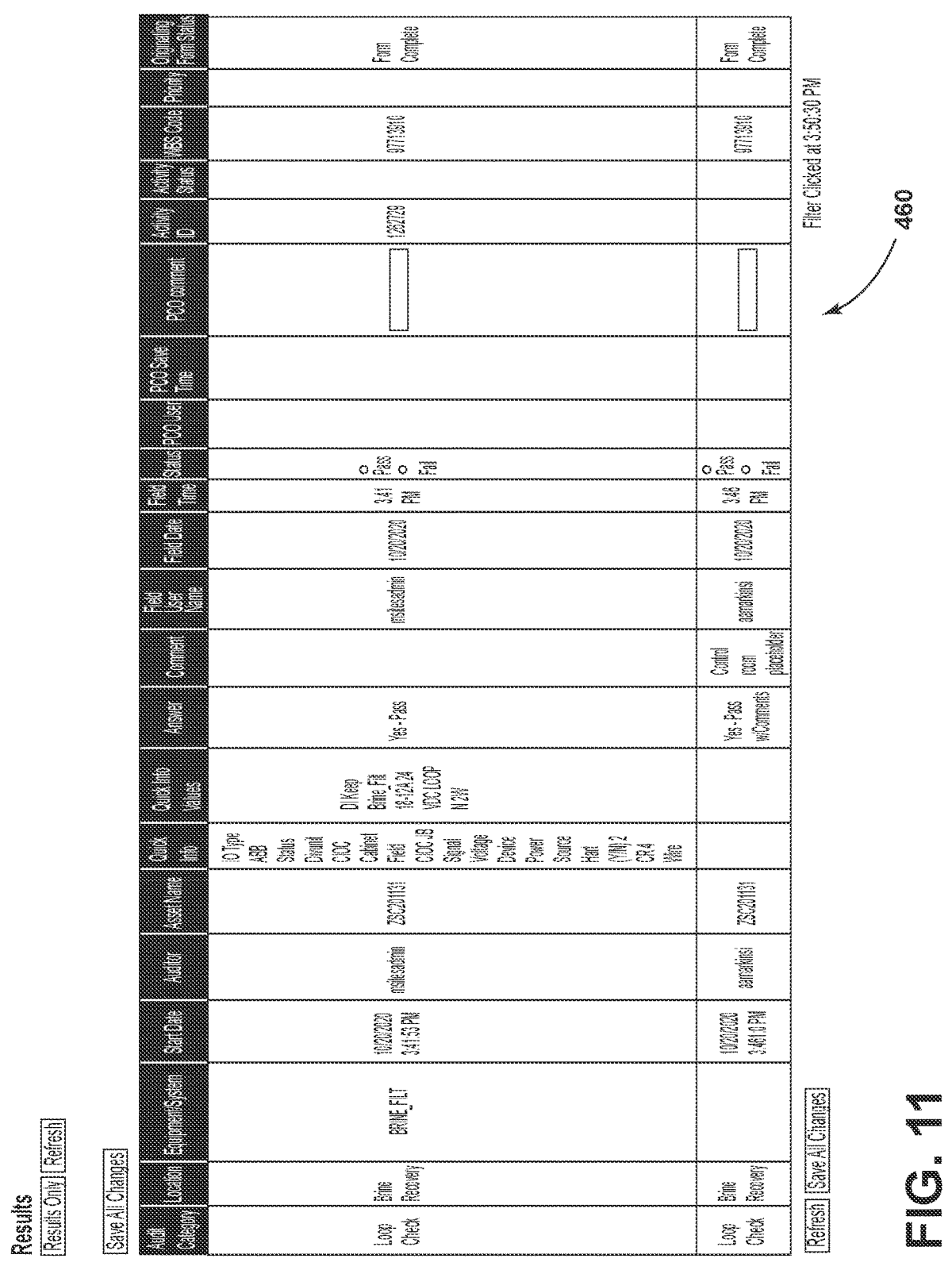
Figure 12:
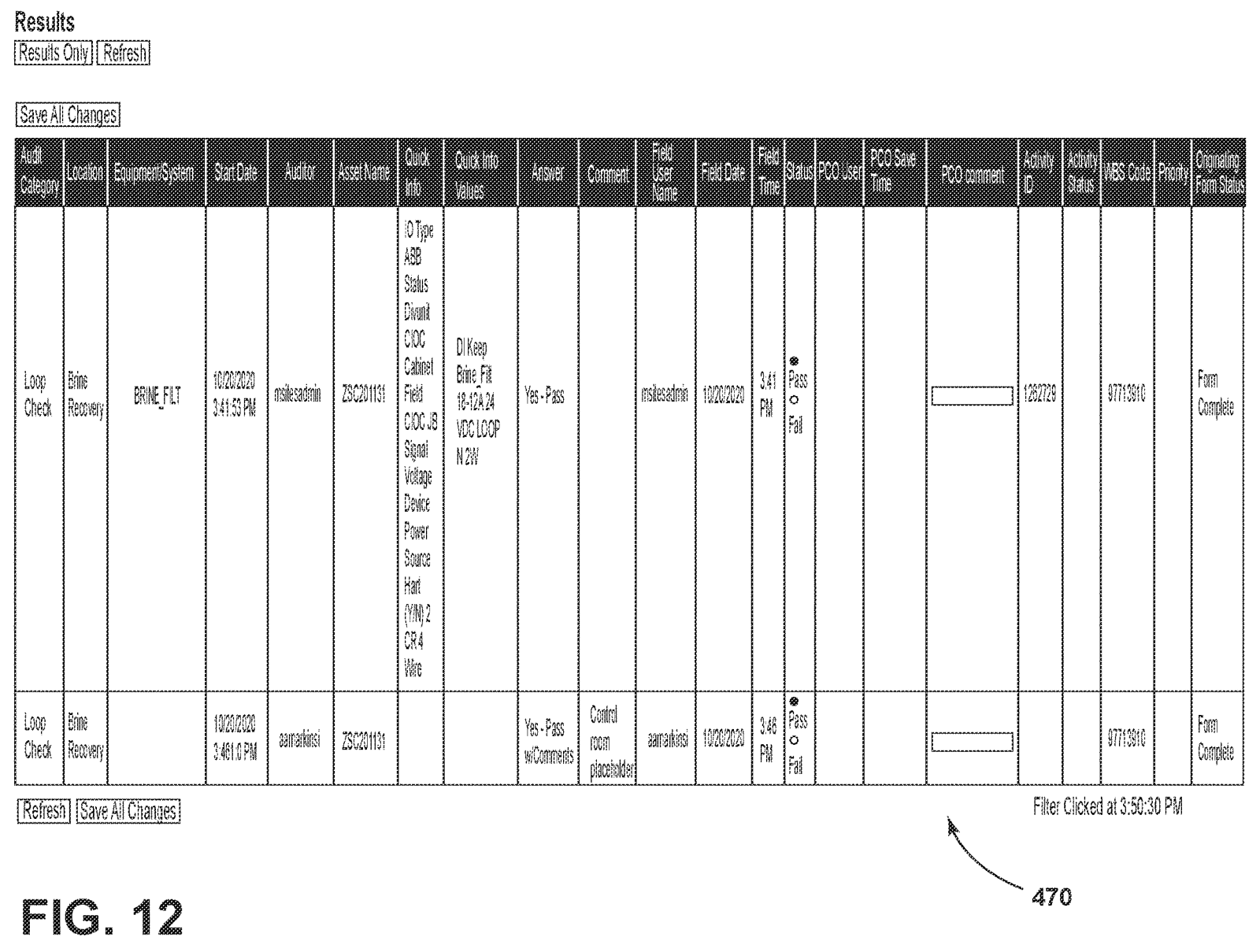

In viewing FIG. 11, a plant control operator notices that the loop check audit result by the field technician occurred five minutes before the loop check audit result was entered by the plant control operator for the same asset, namely asset ZSC201131. As the audit results are close in time, clearly the loop check was successful. An open pass/fail decision status is shown for both audit information, as neither Pass nor Fail circles in the row of data are selected. Thereafter, at step 420, a mouse pointer or other input mechanism controlled by a plant control operator is used to select Pass for both asset results for asset ZSC201131. In a graphical user interface portion 470 shown in FIG. 12, besides the Pass circles being filled in, the name of the plant control operator is automatically filled in the PCO user boxes, and the time of the Pass input selection or result is also automatically filled in the PCO Save Time boxes. Thus, an open pass/fail decision status for each of the audit information records is changed to Pass. Moreover, recategorizing the audit results from "blank" to "Has a value" occurs at one or more of the electronic processors 100, at the client application server 50 or at the relational database 200. Thus, the audit information is now a completed audit result.

At step 424, the results supplied to the electronic processor 100 of the computing device 30 from the relational database 200 operate for removing both of the completed asset audits automatically from the listing of audit assets waiting for Pass/Fail Resolution by a plant control operator as the audit assets are no longer "blank." The technician or operator creating or completing asset audit results is always identified and stored by the system. Both audit results for asset ZSC201131 remain stored in the relational database 200. A search or a refresh for "blank" audit results no longer includes records for asset ZSC201131.

At step 428, when the audit result for asset ZSC201131 is exported, only a single audit result is transmitted. In one embodiment, the audit result with the most recent start date/time stamp is the audit result that is selected for export. In another embodiment, the audit result from a field technician is the audit result selected for export, as no audit result with a placeholder is exported.

The arrangement illustrated in the flowchart of FIG. 9 provides an advantage over the prior art in that a loop check is completed even when a portable smart device 80 of a field technician is not in voice communication or data communication with computing device 30 in a control room.

Export Management

Figure 13:
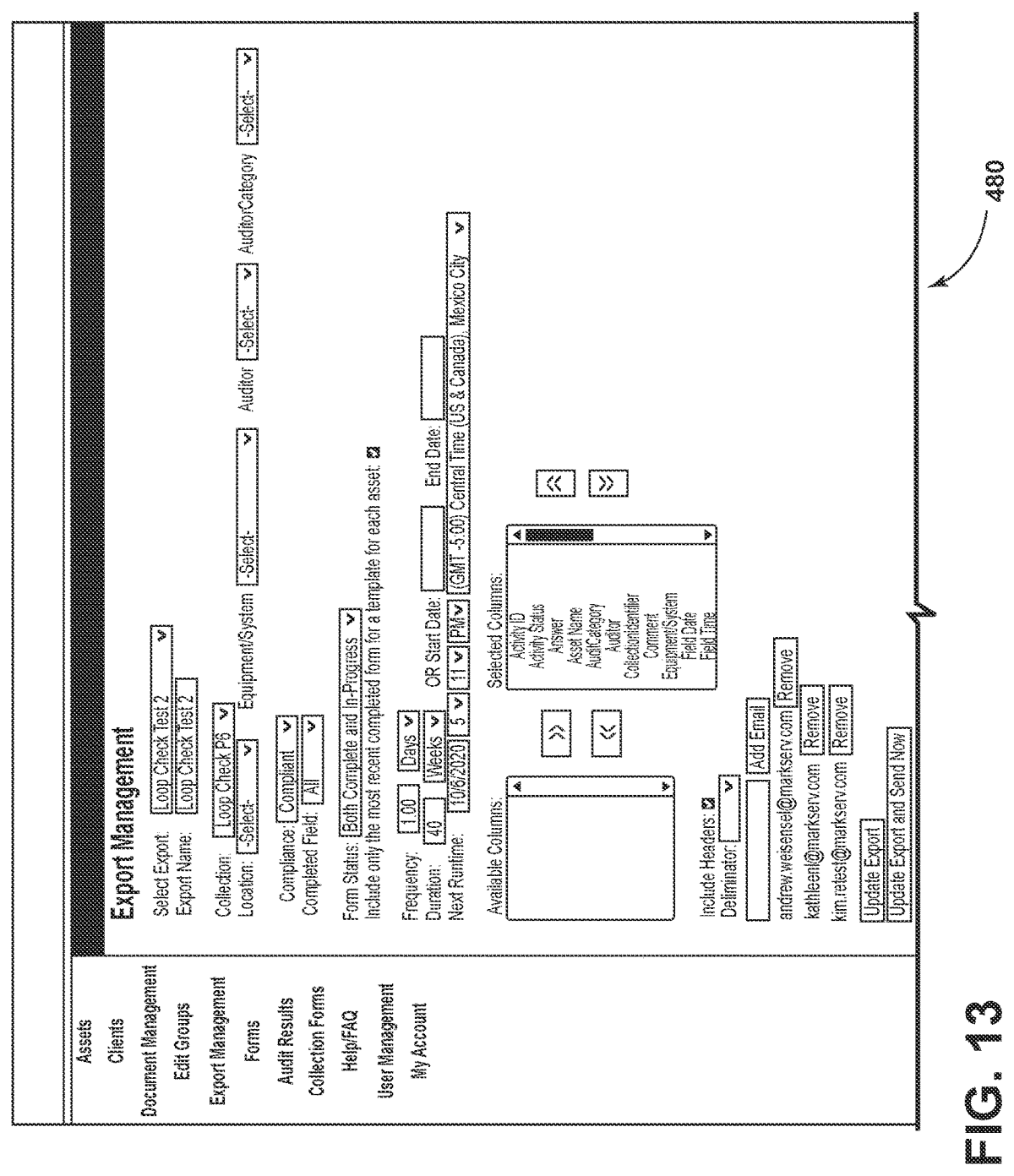

FIG. 13 shows an export management administration user interface 480 for display on the computing device 30. The export management administration user interface 480 is selectable by an icon on the left side of the administration user interface 300. The audit results for export can be filtered in a similar manner as filtering to obtain an audit result list as discussed above. Similar searches of the relational database 200 occur. The reports can be generated daily or weekly or otherwise, dependent on the Frequency selection chosen from a drop-down box shown in FIG. 13. Likewise, the columns to be provided in a report can be customized. Finally, e-mail addresses where the reports are sent can be added or removed. Thus, export reports of selected audit results for various persons are capable of being preset for weeks or months into the future. This arrangement provides convenience and simplicity for automatic report generation.

The phrase "plant control operator" or the abbreviation "PCO" includes console engineers, control room operators, and even a person working remotely from home or elsewhere that also has access to a distributed control system (DCS) workstation 90, in combination with a computing device 30.

The phrase "PASS/FAIL" for selection entries includes or is equivalent to "YES/NO," "READY/DOWN," "GO/OFF" and other phrases directed to indicating whether an asset is operative for commissioning an industrial facility.

Thus, embodiments provide, among other things, a method and apparatus to perform an interactive commissioning procedure in an industrial facility. Various features and advantages of one or more embodiments are set forth in the following claims.

What is claimed is:

1. A system for performing a commissioning procedure for an industrial facility utilizing assets that include asset identifiers for an industrial facility, the system comprising:
   a relational database having sets of tables;
   a web server in communication with the relational database; and
   an electronic processor in communication with the web server including a user interface,
   the electronic processor configured to:
      receive a series of selections for audit information;
      generate a search query based on the series of selections;
      transmit the search query to the web server and the relational database for execution of the search query to obtain audit information;
      receive the audit information, and populate the audit information into a record including an asset location, an asset name, a date/time stamp, an answer/recommendation, and an open pass/fail decision status for each of the assets and display the record on the user interface;
      receive a selection of pass or fail for audit information of a first asset;
      transmit a pass/fail selection for the audit information of the first asset to the relational database for storage, and display the pass/fail selection on the user interface; and
      recategorize the audit information from the pass/fail result for the first asset in the relational database as an audit result;
   wherein the audit information that is displayed is provided remotely by a portable smart device that scans an asset identifier of a scanned asset and provides a display of a form with pass/fail selection entries for selection that include PASS, PASS with comments, and FAIL with comments, and wherein the form is provided by the portable smart device to the relational database to populate audit information in the relational database for the scanned asset.

2. The system according to claim 1, wherein an audit category is a loop check and the commissioning procedure is a loop check procedure, and wherein the records of audit information are provided for completing commissioning of an industrial facility.

3. The system according to claim 1, including:

a client application server, wherein the web server is in communication with the client application server, and the relational database is in communication with the client application server, wherein the web server includes a web portal for communicating with the client application server and a computing device including the electronic processor, and wherein the search query is executed by one or more additional electronic processors located in one or more of the web server, the client application server, and the relational database.

4. The system according to claim 3, wherein an audit category is a loop check and the commissioning procedure is a loop check procedure, and wherein the series of selections to obtain audit results includes a series of drop-down selections displayed on the user interface.

5. The system according to claim 3, wherein the relational database includes a series of primary keys and foreign keys, wherein the electronic processor is configured to remove the recategorized audit result from the audit information provided by the user interface on the display as the category of the audit information has been changed, and wherein an export management administration user interface is selectable by an icon on the user interface to generate a report regarding commissioning of the industrial facility.

6. The system according to claim 1, wherein the pass/fail selection entries include FAIL-No power present and FAIL-No signal present, and wherein actuation of a button on the portable smart device provides a wireless connection to a network to provide the form in for populating audit results in real-time for the scanned asset.

7. The system according to claim 1, wherein the electronic processor is configured to receive the selection of pass or fail from an input mechanism as a result of a plant control operator viewing indicia displayed on a distributed control system (DCS) workstation.

8. A method of performing a commissioning procedure for an industrial facility utilizing assets that include asset identifiers, the method comprising:

receiving, at an electronic processor of a computing device, a series of selections to obtain audit information;

from the selections, generating a search query with the electronic processor for obtaining audit information for the assets;

transmitting the search query to a web server and a relational database for execution of the search query to obtain audit information;

executing the search query with at least another processor and the relational database;

receiving the audit information and populating the audit information into a record including an asset location, an asset name, a date/time stamp, an answer/recommendation, and an open pass/fail decision status for each of the assets;

providing the audit information to the electronic processor of the computing device to display the record on the user interface;

receiving, at the electronic processor, a selection of pass or fail for the audit information of a first asset;

transmitting a pass/fail result for the first asset to the relational database via the web server for storage, and displaying the pass/fail result for the first asset upon the user interface; and recategorizing the audit information from the pass/fail result for the first asset in the relational database as an audit result, wherein the series of selections to obtain audit information include a series of drop-down selections displayed on the user interface; and wherein the audit information that is displayed is provided by data in the relational database obtained remotely by a portable smart device that scans an asset identifier of an asset and provides a display of a fol in with pass/fail selection entries that include PASS, PASS with comments, and FAIL-No power present.

9. The method according to claim 8, including a step of removing the audit result for the first asset from the audit information provided by the user interface on the display as the search query has a value "blank" for Completed Field, and wherein an audit category is a loop check and the commissioning procedure is a loop check procedure.

10. The method according to claim 8, wherein the pass/fail selection entries of the form include FAIL-No signal present, and FAIL with comments.

11. The method according to claim 8, wherein the search query for obtaining the audit information includes Completed Field with a value "blank" to obtain only audit information with an open pass/fail decision status, and wherein an "in progress" compliance value indicates incomplete audit information from the portable smart device.

12. The method according to claim 8, wherein the electronic processor is configured to receive the selection of pass or fail from an input mechanism in response to indicia displayed on a distributed control system (DCS) workstation.

13. The method according to claim 8, wherein, when the portable smart device is not capable of providing audit information with a wireless connection to the computing device via the relational database, and an event is displayed on a distributed control system (DCS) workstation, a plant control operator obtains a form with pass/fail selection entries to generate audit information.

14. The method according to claim 13, wherein the pass/fail selection entries for a plant control operator include PASS, PASS with comments, FAIL-No power present, FAIL-No signal present, and FAIL with comments, and wherein the form is provided on a different user interface/window provided for the computing device.

15. The method according to claim 14, wherein the form on the different user interface/window receives an asset name for an asset from inputs by a plant control operator.

16. The method according to claim 15, wherein the form is processed to populate a PCO audit information for the asset and stored in the relational database, and the PCO audit information is displayed with the audit information, the PCO audit information including a listing of a plant control operator as a source of the PCO audit information.

17. A method of performing a commissioning procedure with an electronic processor for displaying a user interface, for an industrial facility utilizing assets that include asset identifiers, the method comprising:
  receiving, at an electronic processor of a computing device, a series of selections to obtain audit information, the audit information including an open pass/fail decision status for each of the assets;
  from the selections, generating a search query with the electronic processor for obtaining the audit information for the assets;
  transmitting the search query to a web server and a relational database for execution of the search query to obtain the audit information;
  receiving the audit information and populating the audit information into a record including an asset location, an asset name, a date/time stamp, and an answer/recommendation for each of the assets, wherein one of the audit information for a first asset is PCO audit information indicated as being provided by a plant control operator, and another one of the audit information is field audit information indicated as being provided by a field technician for the first asset;
  receiving, at the electronic processor, a selection of pass or fail for the field audit information or for the PCO audit information for the first asset;
  providing a pass/fail result for the field audit information or for the PCO audit information for the first asset upon the user interface in response to the selection; and
  recategorizing the PCO audit information and the field audit information for the first asset from the pass/fail result for the first asset in the relational database.

18. The method according to claim 17, wherein the selection of pass or fail for the field audit information or for the PCO audit information for the first asset includes the selection of a pass/fail selection entry from PASS, PASS with comments, FAIL-No power present, FAIL-No signal present, and FAIL with comment.

19. The method according to claim 17, wherein the pass/fail result for the field audit info, Illation for the first asset also automatically passes or fails the PCO audit information for the first asset, and
  wherein an audit category is a loop check and the commissioning procedure is a loop check procedure.

* * * * *

UNITED STATES PATENT AND TRADEMARK OFFICE
CERTIFICATE OF CORRECTION

PATENT NO. : 11,966,211 B2
APPLICATION NO. : 16/953876
DATED : April 23, 2024
INVENTOR(S) : Andrew Weisensel et al.

It is certified that error appears in the above-identified patent and that said Letters Patent is hereby corrected as shown below:

In the Claims

Column 15, Claim 6, Line 47: please remove "in" from between "form" and "for"

Column 16, Claim 8, Line 25: please replace "fol in" with --form--

Column 18, Claim 18, Line 17: please replace "comment" with --comments--

Column 18, Claim 19, Line 19: please replace "info, Illation" with --information--

Signed and Sealed this
Twenty-seventh Day of May, 2025

Coke Morgan Stewart
*Acting Director of the United States Patent and Trademark Office*